United States Patent
Cheong

(10) Patent No.: US 8,494,041 B1
(45) Date of Patent: *Jul. 23, 2013

(54) EFFICIENT TAPPED DELAY LINE EQUALIZER METHODS AND APPARATUS

(75) Inventor: Kok-Wui Cheong, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,853

(22) Filed: May 23, 2012

Related U.S. Application Data

(63) Continuation of application No. 11/446,480, filed on Jun. 2, 2006, now Pat. No. 8,199,804.

(60) Provisional application No. 60/733,907, filed on Nov. 4, 2005.

(51) Int. Cl.
  *H03K 5/159* (2006.01)
(52) U.S. Cl.
  USPC ........... 375/233; 375/285; 375/229; 375/232; 375/348; 455/137; 455/140
(58) Field of Classification Search
  USPC ......................................... 375/233
  See application file for complete search history.

(56) References Cited

U.S. PATENT DOCUMENTS

| | | | |
|---|---|---|---|
| 4,669,091 A | 5/1987 | Nossen | |
| 5,050,186 A | 9/1991 | Gurcan et al. | |
| 5,097,482 A | 3/1992 | Serizawa et al. | |
| 5,703,905 A * | 12/1997 | Langberg | 375/232 |
| 5,946,351 A | 8/1999 | Ariyavisitakul et al. | |
| 6,011,813 A | 1/2000 | Ghosh | |
| 6,680,902 B1 | 1/2004 | Hudson | |
| 6,970,524 B1 | 11/2005 | Zeng et al. | |
| 7,339,989 B1 | 3/2008 | McAdam et al. | |
| 2005/0053129 A1 | 3/2005 | Yousef | |

OTHER PUBLICATIONS

Ai-Dhahir, Naofal et al., "Efficient Computation of the Delay-Optimized Finite-Length MMSE-DFE," IEEE Transactions on Signal Processing, vol. 44, No. 5, May 1996, pp. 1288-1292.

* cited by examiner

*Primary Examiner* — Lihong Yu

(57) ABSTRACT

Methods and apparatus are provided for performing equalization of communication channels. In an embodiment of the invention, at least one tap can be selected from a set of feedforward taps of feedforward filter circuitry, where each tap of the selected at least one tap has a magnitude that is greater than or substantially equal to a magnitude of any tap of the set of feedforward taps that is not in the selected at least one tap. In addition, at least one tap can be added to a set of taps of feedback filter circuitry in communication with the feedforward filter circuitry. The invention advantageously allows for more efficient and reliable equalization of communication channels.

20 Claims, 12 Drawing Sheets

EFFICIENT TAPPED DELAY LINE EQUALIZER METHODS AND APPARATUS

CROSS-REFERENCE TO RELATED APPLICATION

This application is a continuation of, commonly-assigned U.S. application Ser. No. 11/446,480, filed Jun. 2, 2006 (allowed), which claims the benefit of U.S. Provisional Application No. 60/733,907, filed Nov. 4, 2005, each of which is hereby incorporated by reference herein in its respective entirety.

BACKGROUND OF THE INVENTION

This application relates to digital communication. More particularly, this application relates to equalizers used in digital communication to compensate for dispersive channels.

A signal may be degraded when sent across a channel. A key challenge in communication theory is how to overcome this degradation to reliably and efficiently receive the correct series of elements that comprise a signal. One type of degradation is dispersion, where each element of a signal spreads in time, potentially overlapping with adjacent elements to create intersymbol interference (ISI).

One example of dispersion occurs when an antenna sends a signal through the air. Because the signal is sent omnidirectionally, it can take multiple paths to reach the destination, with each path encountering its own set of obstacles. These obstacles can partially reflect the signal, partially absorb the signal, or both, resulting in the destination receiving multiple versions of the signal at varying strengths and at varying times. The main path usually yields the strongest version, with any preceding versions known as pre-echoes and any subsequent versions known as post-echoes.

An equalizer is a device designed to compensate for signal dispersion. A common type of equalizer is the decision-feedback equalizer (DFE), which makes decisions based on pre-echoes to substantially cancel out post-echoes. The DFE is often capable of adapting to channels whose characteristics vary over time, yielding relatively accurate performance in the presence of significant ISI.

For channels whose pre-echoes and post-echoes are spread over a relatively long period of time, known as long delay spread channels, the DFE often requires more computations to properly process the echoes to equalize the channel. More computations generally increase the amount of hardware and time required to achieve accurate performance. A need remains for an equalizer capable of more efficiently and reliably equalizing such channels.

SUMMARY OF THE INVENTION

In accordance with this invention, methods and apparatus are provided for configuring equalization circuitry. In one aspect of the invention, at least one tap can be selected from a set of feedforward taps of feedforward filter circuitry. Each tap of the selected at least one tap has a magnitude greater than or substantially equal to a magnitude of any tap of the set of feedforward taps that is not in the selected at least one tap. At least one tap can be added to a set of feedback taps of feedback filter circuitry in communication with the feedforward filter circuitry.

In another aspect of the invention, circuitry for equalizing an input signal can include feedforward filter circuitry operable to receive the input signal, feedback filter circuitry in communication with the feedforward filter circuitry, and control circuitry in communication with the feedforward and feedback filter circuitries. The control circuitry can include selector circuitry in communication with the feedforward filter circuitry and configured to select at least one tap from a set of feedforward taps of the feedforward filter circuitry, where each tap of the selected at least one tap has a magnitude that is greater than or substantially equal to a magnitude of any tap of the set of feedforward taps that is not in the selected at least one tap. The control circuitry can also include feedback tap addition circuitry in communication with said feedback filter circuitry and configured to add at least one tap to a set of feedback taps of the feedback filter circuitry.

In yet another aspect of the invention, circuitry for equalizing an input signal can include feedforward filter means for receiving the input signal, feedback filter means for receiving a signal responsive to the input signal, and control means for controlling a set of feedforward taps of the feedforward filter means and a set of feedback taps of the feedback filter means. The feedback filter means can be in communication with the feedforward filter means and the control means can be in communication with the feedforward filter means and the feedback filter means. The control means can include selector means for selecting at least one tap from the set of feedforward taps, where the selector means is in communication with the feedforward filter means and each tap of the selected at least one tap has a magnitude that is greater than or substantially equal to a magnitude of any tap of the set of feedforward taps that is not in the selected at least one tap. The control means can further include feedback tap addition means for adding at least one tap to the set of feedback taps, where the feedback tap addition means is in communication with the feedback filter means.

In yet another aspect of the invention, a computer program running on a processor can perform the steps of selecting at least one tap from a set of feedforward taps of feedforward filter circuitry, where each tap of the selected at least one tap has a magnitude greater than or substantially equal to a magnitude of any tap of the set of feedforward taps that is not in the selected at least one tap, and adding at least one tap to a set of feedback taps of feedback filter circuitry in communication with the feedforward filter circuitry.

The computer program can also compute the set of feedback taps and compute the set of feedforward taps based on a result of the computing of the set of feedback taps. In one embodiment, the computing the set of feedback taps and the set of feedforward taps can be in accordance with, respectively, a feedback Cholesky factorization and a feedforward back-substitution.

The computer program can also generate a feedforward output signal and a feedback output signal from, respectively, the feedforward filter circuitry and the feedback filter circuitry, and compute an error signal based at least in part on the feedforward and feedback output signals. The computer program can adapt the set of feedforward taps and the set of feedback taps based on the computed error signal. In one embodiment, the adapting the sets of taps can include altering a value of a tap of the set of feedforward taps and a value of a tap of the set of feedback taps based on a result of performing at least one LMS algorithm. In another embodiment, the computer program can compute a sign of the computed error signal.

The computer program can also compare a magnitude of a lowest-magnitude tap of the selected at least one tap to a magnitude of a highest-magnitude tap in the set of feedforward taps that is not in the selected at least one tap. The magnitude of the lowest-magnitude tap can be less than or substantially equal to a magnitude of any other tap of the selected at least one tap, while the magnitude of the highest-magnitude tap can be greater than or substantially equal to a magnitude of any other tap of the set of feedforward taps that is not in the selected at least one tap. If the magnitude of the lowest-magnitude tap is less than the magnitude of the highest-magnitude tap, then the computer program can remove the lowest-magnitude tap from the selected at least one tap and add the highest-magnitude tap to the selected at least one tap.

The computer program can also sort the set of feedforward taps by magnitude to form an ordered set of feedforward taps and select at least one consecutive tap from the ordered set of feedforward taps. Each tap of the selected at least one consecutive tap has a magnitude that is greater than or substantially equal to a magnitude of any tap of the ordered set of feedforward taps that is not in the selected at least one consecutive tap.

The computer program can also: process an input signal using the set of feedforward taps to generate a feedforward output signal; add a signal responsive to the feedforward output signal to a signal responsive to a feedback output signal to generate an adder output signal; compare a voltage of a signal responsive to the adder output signal to at least one voltage threshold to generate a decision output signal; and process a signal responsive to the decision signal using the set of feedback taps to generate the feedback output signal. In one embodiment, the processing the input signal can include performing at least one floating-point (or fixed-point) multiplication on the input signal and at least one value of the selected at least one tap. The processing the signal responsive to the decision output signal can include performing at least one fixed-point (or floating-point) multiplication on the decision output signal and at least one value of the set of feedback taps.

The computer program described above can be used to operate any suitable application, such as a high-definition television or a set-top box.

The invention therefore advantageously allows more efficient and reliable equalization of channels. Advantageously, the invention allows such equalization with relatively accurate performance and relatively low complexity.

BRIEF DESCRIPTION OF THE DRAWINGS

The above and other objects and advantages of the invention will be apparent upon consideration of the following detailed description, taken in conjunction with the accompanying drawings, in which like reference characters refer to like parts and in which.

DETAILED DESCRIPTION OF THE INVENTION

Figure 1:
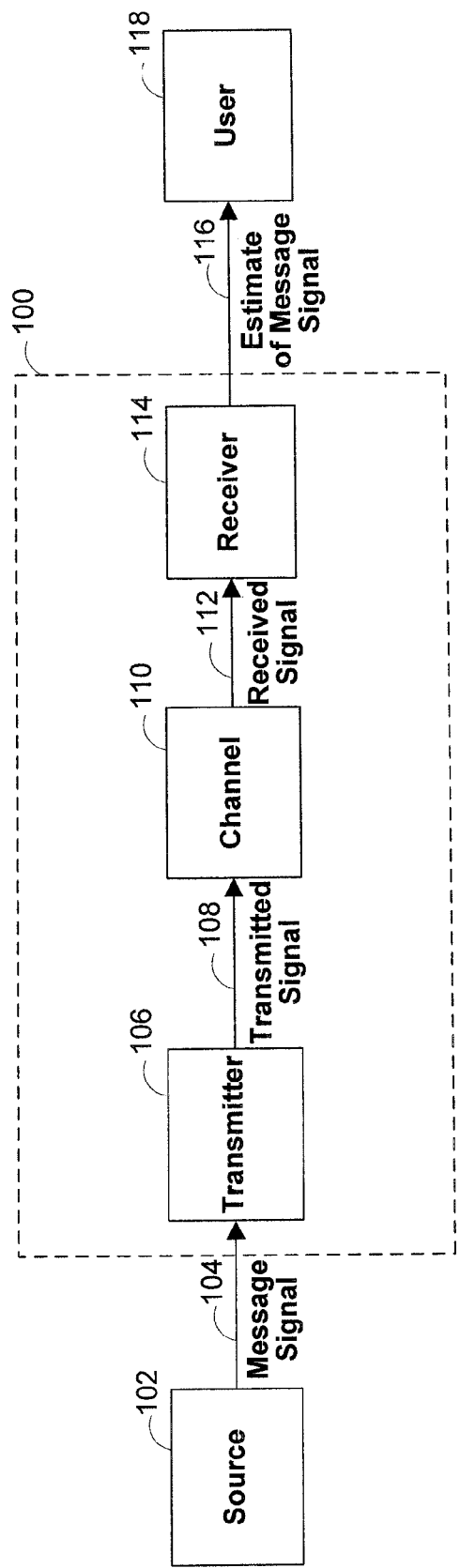
FIG. 1 is a block diagram of an illustrative communication system.

FIG. 1 is a block diagram of an illustrative communication system 100 that can send information from a source 102 to a user 118. Source 102 can send a message signal 104 via a transmitter 106 that can encode message signal 104 as a sequence of elements, collectively referred to as the encoded message, whose values can be taken from a finite set of numbers K. In one embodiment, message signal 104 can be encoded with a binary encoding scheme, and K can be a set including the logical values 0 and 1. A transmitted signal 108 carrying the sequence of elements can travel across a channel 110 that potentially distorts transmitted signal 108 through various forms of degradation, such as dispersion (e.g., reflection off physical obstacles in channel 110). The nature and extent of the dispersion displayed by a received signal 112 at the end of channel 110 can depend on individual channel characteristics that can be time-varying. Received signal 112 can be approximately a sum of transmitted signal 108 and various scaled versions of transmitted signal 108 shifted in time. Versions that are shifted earlier in time are known as "pre-echoes" and versions that are shifted later in time are known as "post-echoes." An amount of time between an earliest pre-echo and a latest post-echo is known as a "delay spread." When this amount of time is relatively large, it is referred to as a "long delay spread." A receiver 114 can process received signal 112 to generate an estimate 116 of message signal 104, which can be sent to user 118. The invention disclosed herein can advantageously compensate for dispersion from channel 110 in a relatively efficient manner, and can be used in receiver 114.

Figure 2:
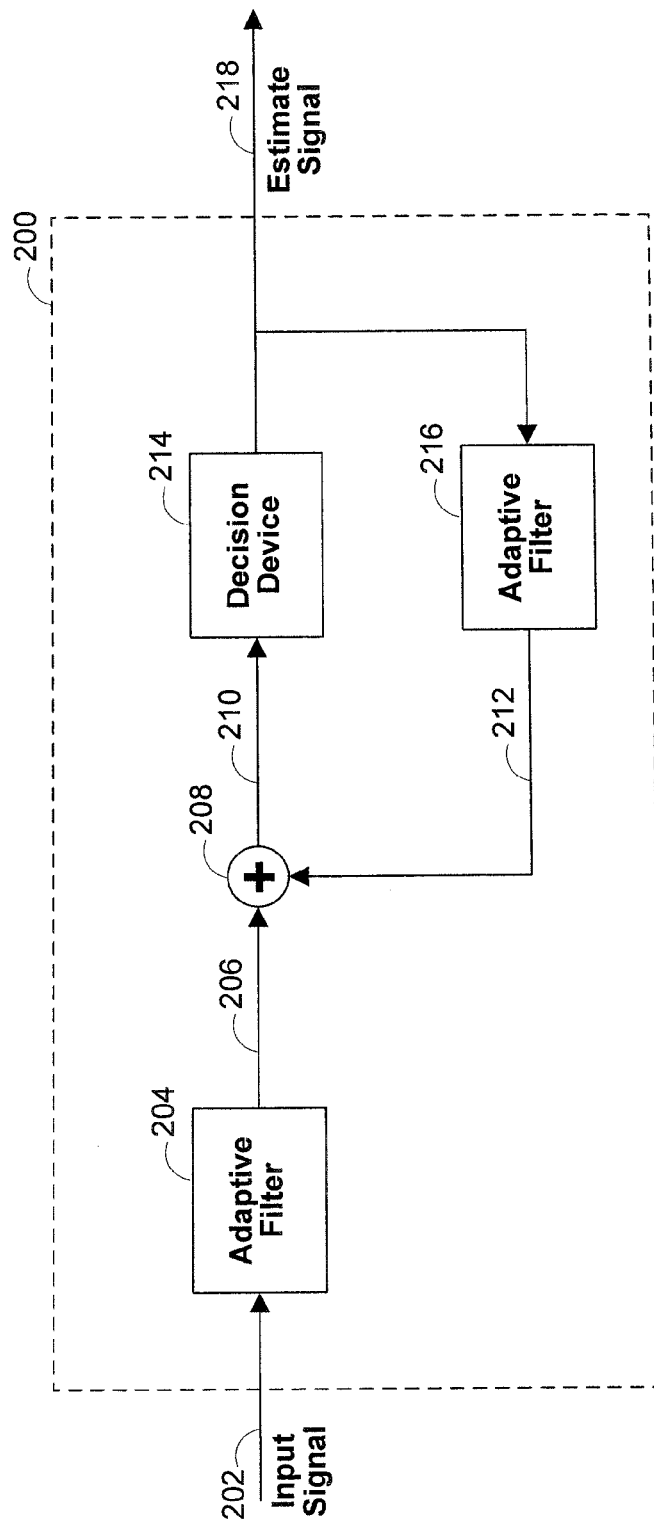
FIG. 2 is a block diagram of an illustrative decision feedback equalizer.

FIG. 2 is a block diagram of an illustrative decision feedback equalizer (DFE) 200 capable of processing an input signal 202 to generate an estimate signal 218. For example, DFE 200 can be used in receiver 114 of FIG. 1, and estimate signal 218 can contain an estimate of message signal 104. In this scenario, input signal 202 can be a digital signal or a digital sampling of an analog signal, and can be coupled to received signal 112. It will be understood that the term "coupled," as used herein, can define either a direct or an indirect connection between elements.

DFE 200 can include first adaptive filter circuitry 204, addition circuitry 208, decision device circuitry 214, and second adaptive filter circuitry 216. First adaptive filter circuitry 204 and second adaptive filter circuitry 216 can process, respectively, a signal coupled to input signal 202 and a signal coupled to estimate signal 218. Preferably, first adaptive filter circuitry 204 can convolve input signal 202 with a first set of taps to generate a first output signal 206, and second adaptive filter circuitry 216 can convolve estimate signal 218 with a second set of taps to generate a second output signal 212. A tap is preferably an adjustable mathematical value, where a "value" can have both a magnitude and a sign. A set of taps (e.g., the set used by first adaptive filter circuitry 204 or by second adaptive filter circuitry 216) can be an ordered set having an adjustable number of elements. The concept of convolution is well-known to those of ordinary skill in the art. Its steps include computing a set of products and computing a sum of those products. First adaptive filter circuitry 204 and second adaptive filter circuitry 216 can implement convolution using, respectively, floating-point multiplication and fixed-point multiplication, which are also well-known in the art. Floating-point multiplication can typically process a wider range of values, but requires more computations and hardware to implement, than fixed-point multiplication.

Addition circuitry 208 can additively combine first output signal 206 and second output signal 212 to generate an adder output signal 210. Decision device circuitry 214 can, in turn, process adder output signal 210 to generate a decision output signal, which can be coupled to estimate signal 218. Decision device circuitry 214 generally can make decisions about adder output signal 210. In particular, decision device circuitry 214 can preferably generate elements whose values are taken from the pre-determined set K, where each generated element has a value of set K relatively close to a corresponding element of adder output signal 210. In one embodiment, decision device circuitry 214 generates an element 0 if the voltage of the corresponding element of adder output signal 210 is closer to a relatively low voltage (e.g., ground voltage) than to a relatively high voltage (e.g., a power supply voltage), and generates an element 1 otherwise.

If DFE 200 uses an equalizing first set of taps and an equalizing second set of taps, decision device circuitry 214 can generate a relatively accurate estimate signal 218, where accuracy can refer to the degree to which estimate signal 218 is consistent with the original transmitted message (e.g., message signal 104 in FIG. 1). In this scenario, addition circuitry 208 can generate an adder output signal 210 substantially free of pre-echoes, allowing device circuitry 214 to make a relatively accurate decision.

An equalizing first set of taps often has a number of elements proportional to the delay spread of the corresponding channel. More particularly, a channel with a long delay spread typically requires an equalizing first set of taps with a relatively large number of taps. A larger number of taps can require first adaptive filter circuitry 204 to perform a relatively larger number of computations. The invention disclosed herein can advantageously equalize a channel 110 using substantially fewer computations than many known equalizers, particularly when the corresponding channel has a relatively long delay spread.

Figure 3:
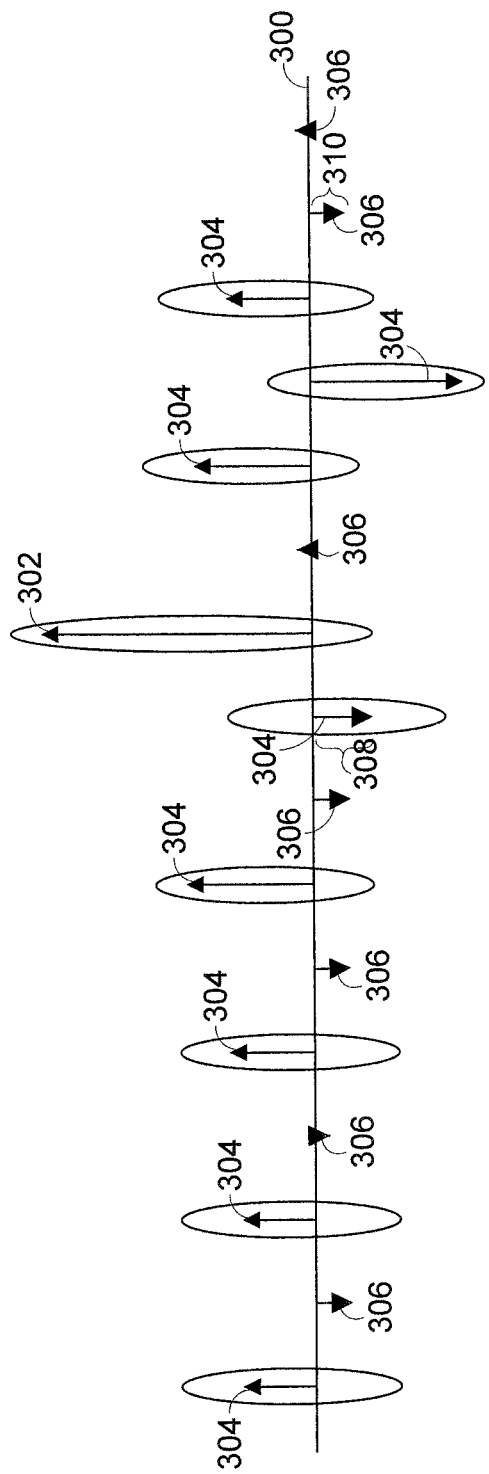
FIG. 3 is a graph of an illustrative set of filter taps selected according to an embodiment of the invention.

FIG. 3 is a graph of an illustrative set of filter taps selected according to an embodiment of the invention. The taps shown in FIG. 3 can be used, for example, in first adaptive filter circuitry 204 or second adaptive filter circuitry 216 in FIG. 2 to filter an input signal via convolution. The taps, which can occur with various magnitudes and signs, are graphed on a time scale 300 at regular intervals, with a "main" tap 302 shown at a reference time 0. As shown, significant taps 304 preferably have substantially larger magnitudes than insignificant taps 306. In particular, the tap with the lowest magnitude 308 out of significant taps 304 has a magnitude greater than or substantially equal to that of the tap with the highest magnitude 310 out of insignificant taps 306. The invention can advantageously identify a set of significant taps 304 and a set of insignificant taps 306 to facilitate efficient equalization of a received signal, as discussed in greater detail below.

Figure 4:
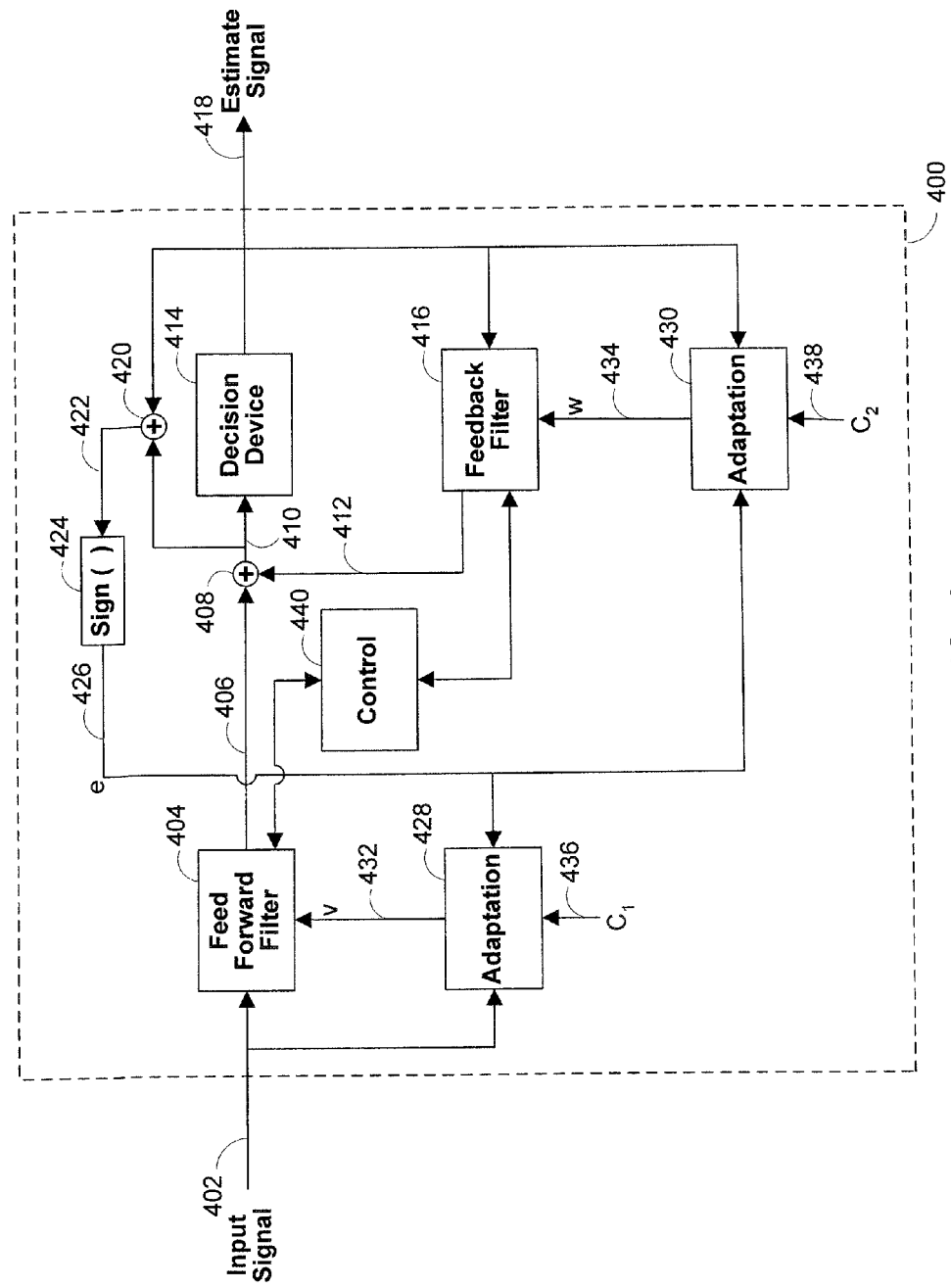
FIG. 4 is a block diagram of an illustrative tapped delay line equalizer according to an embodiment of the invention.

FIG. 4 is a block diagram of an illustrative tapped delay line equalizer (IDLE) 400 according to an embodiment of the invention. IDLE 400 can process an input signal 402 to generate an estimate signal 418 which can contain or represent an estimate of an encoded message. For example, IDLE 400 can be used in receiver 114 to generate an estimate of message signal 104. Input signal 402 can be a digital signal or a digital sampling of an analog signal.

Feedforward filter circuitry 404 and feedback filter circuitry 416 can process, respectively, input signal 402 and estimate signal 418. Feedforward filter circuitry 404 preferably performs convolution on input signal 402 with a set of taps selected from a set of feedforward taps 432 to generate a feedforward output signal 406. Similarly, feedback filter circuitry 416 preferably performs convolution on estimate signal 418 with a set of feedback taps 434 to generate a feedback output signal 412. In one embodiment, feedforward filter circuitry 404 and feedback filter circuitry 416 can perform convolution on their input signals using, respectively, floating-point multiplication and fixed-point multiplication.

First addition circuitry 408 can additively combine feedforward output signal 406 and feedback output signal 412 to generate an adder output signal 410. Decision device circuitry 414 can process adder output signal 410 to generate a decision output signal, which can be coupled to estimate signal 418. Decision device circuitry 414 preferably generates elements whose values are taken from the pre-determined set K, where each generated element has a value of set K relatively close to a corresponding element of adder output signal 410. In one embodiment, decision device circuitry 414 generates an element 0 if the voltage of the corresponding element of adder output signal 410 is closer to a relatively low voltage (e.g., ground voltage) than to a relatively high voltage (e.g., a power supply voltage), and generates an element 1 otherwise.

Second addition circuitry 420 can mathematically combine adder output signal 410 and the decision output signal to generate an error signal 422. Each element of error signal 422 is preferably a mathematical difference between an element of adder output signal 410 and a corresponding element of the decision output signal (it will be noted that a sign inversion of either adder output signal 410 or the decision output signal may be necessary to compute this difference).

First adaptation circuitry 428 and second adaptation circuitry 430 can process a signal coupled to error signal 422. In one embodiment of the invention, first adaptation circuitry 428 and second adaptation circuitry 430 are directly coupled to error signal 422. In another embodiment of the invention, sign circuitry 424 can process error signal 422 to generate a signed error signal 426, where each element of signed error signal 426 has either a first value or a second value. More particularly, sign circuitry 424 can generate the first value when a corresponding element of error signal 422 has a positive value and generates the second value when a corresponding element of error signal 422 has a negative value. Using signed error signal 426 in place of error signal 422 can advantageously reduce the number of computations performed by first and second adaptation circuitries 428 and 430, thereby increasing the efficiency of IDLE 400.

First adaptation circuitry 428 and second adaptation circuitry 430 can generate, respectively, a set of feedforward taps 432 and a set of feedback taps 434. First adaptation circuitry 428 and second adaptation circuitry 430 can compute, respectively, a set of feedforward taps 432 for use by feedforward filter circuitry 404 and a set of feedback taps 434 for use by feedback filter circuitry 416, where these sets of taps are collectively capable of substantially equalizing channel 110. In one embodiment, second adaptation circuitry 430 computes feedback taps 434 by performing a feedback Cholesky factorization, while first adaptation circuitry 428 computes feedforward taps 432 by performing a feedforward back-substitution. Cholesky factorization and back-substitution are described in N. Al-Dhahir and J. M. Cioffi, "Efficient Computation of the Delay-Optimized Finite-Length MMSE-DFE," *IEEE Transactions on Signal Processing*, vol. 44, no. 5, May 1996, which is hereby incorporated by reference herein in its entirety. Alternatively, control circuitry 440 can generate feedforward taps 432 and feedback taps 434, as discussed below in reference to FIG. 5.

First adaptation circuitry 428 and second adaptation circuitry 430 can also adapt, respectively, feedforward taps 432 and feedback taps 434 to adjust IDLE 400 to compensate for changes in channel characteristics. In one embodiment, first adaptation circuitry 428 can alter feedforward taps 432 using a LMS algorithm that accepts input signal 402, first adaptation input signal 436, and a signal coupled to error signal 422 as inputs. Similarly, second adaptation circuitry 430 can alter feedback taps 434 using a LMS algorithm that has as inputs a signal coupled to the decision output signal, a second adaptation input signal 438, and a signal coupled to error signal 422. LMS algorithms are well known in the art as a method for progressively approaching a state with relatively low error.

In one implementation, a LMS algorithm can update a vector $v_k$ storing tap values of feedforward taps 432 using the following equation:

$$v_{k+1} = v_k + c_1 e_k x_k,$$

where $v_{k+1}$ is a vector of a next set of feedforward taps 432, $v_k$ is a vector of current feedforward taps 432, $c_1$ is a constant of first adaptation input signal 436, $e_k$ is a current element of a signal coupled to error signal 422 (e.g., a current sign of signed error signal 426), and $x_k$ is a vector of both current and past elements of input signal 402. Similarly, a LMS algorithm can update a vector $w_k$ storing tap values of feedback taps 434 using the following equation:

$$w_{k+1} = w_k + c_2 e_k y_k,$$

where $w_{k+1}$ is a vector of a next set of feedback taps 434, $w_k$ is a vector of current feedback taps 434, $c_2$ is a constant of second adaptation input signal 438, $e_k$ is a current element of a signal coupled to error signal 422 (e.g., a current sign of signed error signal 426), and $y_k$ is a vector of both current and past elements of estimate signal 418.

In accordance with an embodiment of the invention, control circuitry 440 can determine which taps feedforward filter circuitry 404 and feedback filter circuitry 416 will use for processing (e.g., convolution) of their respective input signals. Through its tap selection, control circuitry 440 can affect both the accuracy of estimate signal 418 and the number of computations IDLE 400 performs before achieving a substantially accurate estimate signal 418. Control circuitry 440 can preferably change its tap selection in response to changes in either feedforward taps 432 or feedback taps 434.

Control circuitry 440 preferably can select a subset of relatively significant taps from feedforward taps 432, for use in feedforward filter circuitry 404. In one embodiment, control circuitry 440 can sort feedforward taps 432 in order of ascending magnitude, then select the last N taps, where N can be any number appropriate for the system in which feedforward filter circuitry 404 is used. By using a subset of the full set of available taps (e.g., the taps represented by vector v of feedforward taps 432), feedforward filter circuitry 404 can advantageously perform substantially fewer computations than when it uses all available taps. The most significant taps are selected in order to preserve the convolution effect of feedforward filter circuitry 404 as much as possible, while substantially reducing the computation required. The number of significant taps selected can preferably be adjustable, and can be determined by experimentation, heuristically, algorithmically, by any combination thereof, or by any other suitable method. It will be noted that, because substantially fewer taps may be used by feedforward filter circuitry 404 as a result of this selection, the accuracy of estimate signal 418 may be undesirably decreased in some cases.

Control circuitry 440 can preferably compensate, at least in part, for any loss in the accuracy of estimate signal 418 resulting from the selection described above by increasing the number of taps used by feedback filter circuitry 416. Because an input to feedback filter circuitry 416 includes values chosen from the relatively small set K by decision device circuitry 414 (e.g., values represented by digital bits), while an input to feedforward filter circuitry 404 includes values taken from a relatively large set of real numbers (e.g., values represented by analog voltages), increasing the number of taps in feedback taps 434 adds substantially less computational complexity than increasing the number of taps used from feedforward taps 432 by a comparable amount. For example, in the embodiment where feedforward filter circuitry 404 and feedback filter circuitry 416 implement, respectively, floating-point and fixed-point multiplication, the feedforward filter circuitry 404 can require more computations and hardware than feedback filter circuitry 416 to convolve the same number of taps. Thus, by decreasing the number of feedforward taps used by feedforward filter circuitry 404 and compensating for that decrease by increasing the number of feedback taps used by feedback filter circuitry 416, the amount of computation performed by IDLE 400 can be substantially reduced while sacrificing relatively little accuracy.

According to an embodiment of the invention, control circuitry 440 can adjust the set of relatively significant taps selected from feedforward taps 432 as feedforward taps 432 are adapted by first adaptation circuitry 430. For example, control circuitry 440 can perform an algorithm that finds a lowest magnitude of the feedforward taps that are currently selected and a highest magnitude of the feedforward taps that are currently not selected. If the lowest magnitude is lower than the highest magnitude, then control circuitry 440 can deselect the feedforward tap with the lowest magnitude and select the feedforward tap with the highest magnitude. Control circuitry 440 can repeat the algorithm until the lowest magnitude of any selected tap is higher than the highest magnitude of any unselected tap. Alternatively, control circuitry 440 can adjust the set of relatively significant taps by sorting feedforward taps 432 in order of ascending or descending magnitude, and then selecting the highest-magnitude N taps to form a set of significant taps.

Figure 5:
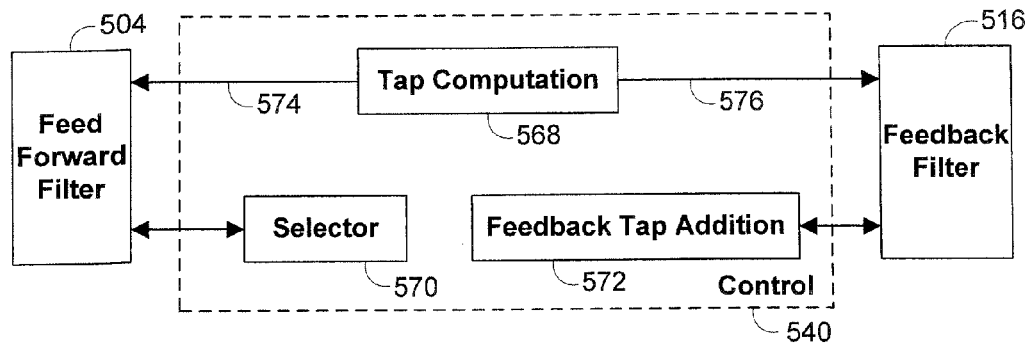
FIG. 5 is a block diagram of illustrative control circuitry according to an embodiment of the invention.

FIG. 5 is a block diagram of illustrative control circuitry 540 according to an embodiment of the invention, which can be included in control circuitry 440 in FIG. 4. Control circuitry 540 can be coupled to feedforward filter circuitry 504, which can be similar to feedforward filter circuitry 404 in FIG. 4, and to feedback filter circuitry 516, which can be similar to feedback filter circuitry 416 in FIG. 4. Control circuitry 540 can include tap computation circuitry 568, which can be configured to compute a set of feedforward taps 574 for use by feedforward filter circuitry 504, and a set of feedback taps 576 for use by feedback filter circuitry 516. In one embodiment, tap computation circuitry 568 computes feedback taps 576 by performing a feedback Cholesky factorization and computes feedforward taps 574 by performing a feedforward back-substitution. Control circuitry 540 can also include selector circuitry 570, which can advantageously be configured to select a subset of relatively significant taps from a set of feedforward taps, for use in feedforward filter circuitry 504. Control circuitry 540 can further include feedback tap addition circuitry 572, which can be configured to advantageously adjust or increase the number of feedback taps used by feedback filter circuitry 516.

Figure 6A:
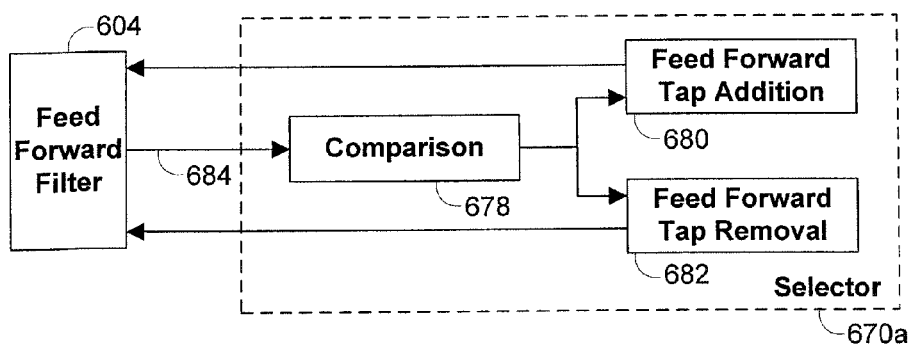
FIG. 6A is a block diagram of illustrative selector circuitry according to an embodiment of the invention.

FIG. 6A is a block diagram of illustrative selector circuitry 670a according to an embodiment of the invention, which can be included in selector circuitry 570 in FIG. 5. Selector circuitry 670a can include comparison circuitry 678 that can be operable to receive feedforward taps 684 from feedforward filter circuitry 604, which can be similar to feedforward filter circuitry 504 in FIG. 5. Comparison circuitry 678 can be configured to perform an algorithm that finds a lowest magnitude of the feedforward taps that are currently selected and a highest magnitude of the feedforward taps that are currently not selected. If the comparison circuitry 678 determines that the lowest magnitude is lower than the highest magnitude, then feedforward tap removal circuitry 682 can deselect the feedforward tap with the lowest magnitude, and feedforward tap addition circuitry 680 can select the feedforward tap with the highest magnitude. Selector circuitry 670a can repeat the algorithm until the lowest magnitude of any selected tap is higher than the highest magnitude of any unselected tap.

Figure 6B:
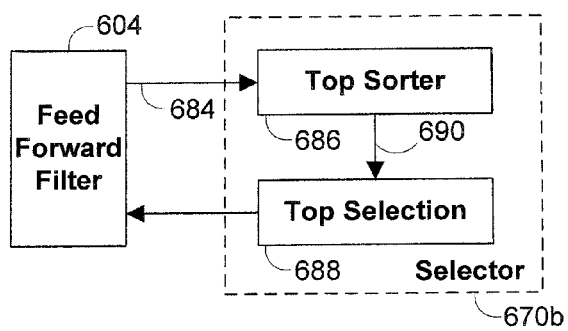
FIG. 6B is a block diagram of alternative illustrative selector circuitry according to an embodiment of the invention.

FIG. 6B is a block diagram of alternative illustrative selector circuitry 670b according to an embodiment of the invention, which can be included in selector circuitry 570 in FIG. 5. Selector circuitry 670b can include tap sorter circuitry 686 that can be configured to sort feedforward taps 684 received from feedforward filter circuitry 604 in order of ascending or descending magnitude to generate ordered feedforward taps 690. Tap selection circuitry 688 can be configured to receive ordered feedforward taps 690 and to select the highest-magnitude N taps, where N can be any number appropriate for the system in which selector circuitry 670b is used.

Figure 7:
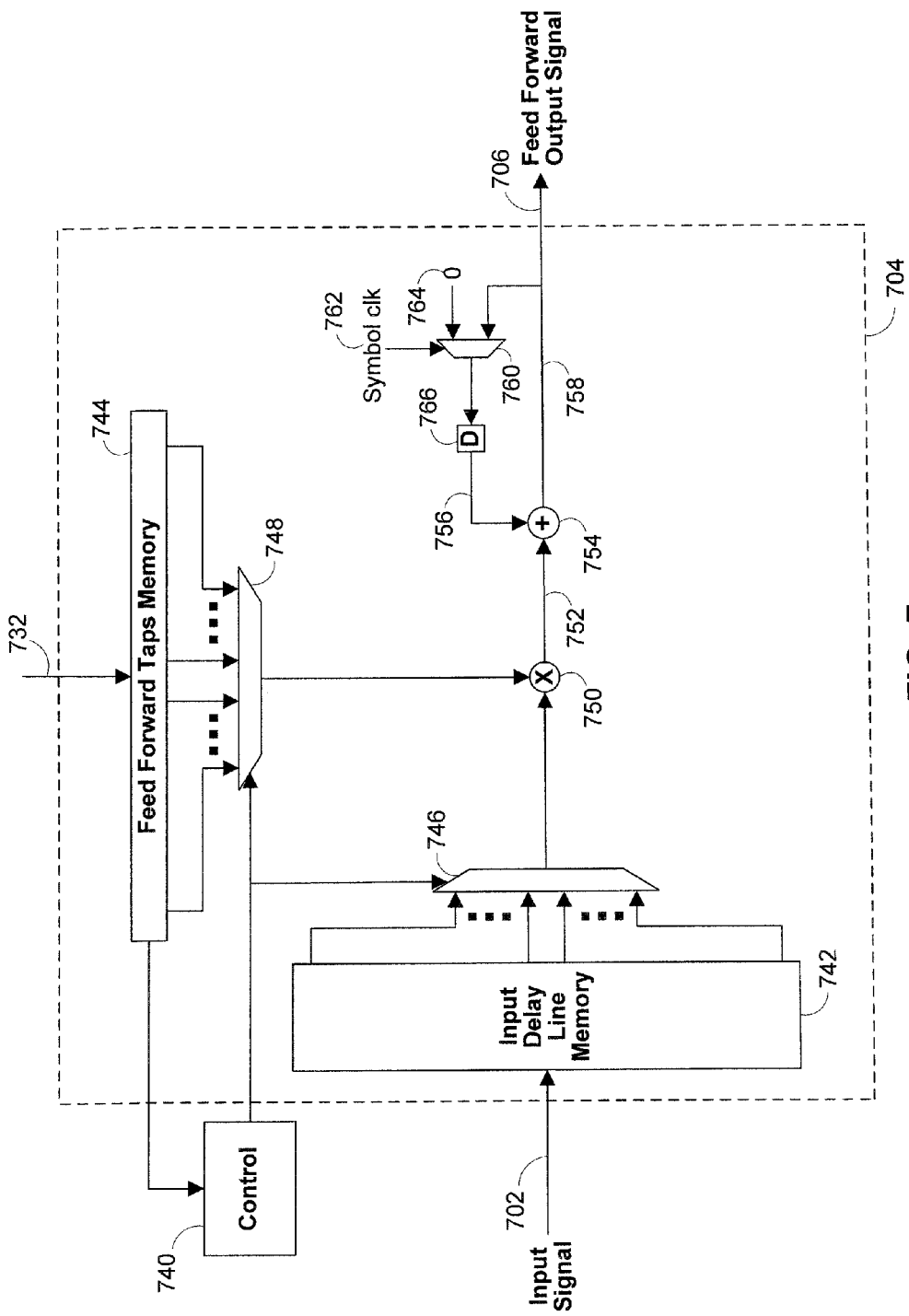
FIG. 7 is a diagram of illustrative feedforward filter circuitry according to an embodiment of the invention.

FIG. 7 is a diagram of an exemplary implementation of feedforward filter circuitry 704, which can be included in feedforward filter circuitry 404 in FIG. 4. Feedforward filter circuitry 704 can perform convolution on an input signal 702 using feedforward taps 732 to generate a feedforward output signal 706. Input signal 702 can be a digital signal or a digital sampling of an analog signal.

An input delay line memory 742 can store a consecutive set of values of input signal 702, which can serve as inputs to an input multiplexer 746. Similarly, a feedforward taps memory 744 can store a set of feedforward taps 732, which can serve as inputs to a taps multiplexer 748. Control circuitry 740, which can be used as control circuitry 440 in FIG. 4, can access feedforward taps 732 stored in feedforward taps memory 744. In accordance with an embodiment of the invention, control circuitry 740 can control which input value is selected by input multiplexer 746 and which input is selected by taps multiplexer 748.

Multiplication circuitry 750 can mathematically combine an output of input multiplexer 746 and an output of taps multiplexer 748 by multiplying the values of the outputs to create a current product 752. In one embodiment, multiplication circuitry 750 can perform floating-point multiplication.

Addition circuitry 754 can add current product 752 to a signal 756, which can be a sum 758 of previous products or a value of approximately 0, to generate a current sum 758. Current sum 758 can serve as an input to a summing multiplexer 760, which can control whether to add a previous sum to current product 752 or to leave current product 752 substantially unchanged. In one embodiment, a symbol clock 762 alternates between selecting previous sum 758 and zero 764 according to a symbol rate of input signal 702. Delay circuitry 766 can ensure that previous sum 758, or zero 764, is correctly added to current product 752 by addition circuitry 754 by supplying an appropriate delay (e.g., matched to a symbol delay of input signal 702). Feedforward output signal 706 can contain elements resulting from the convolution performed by feedforward filter circuitry 704, and can be coupled to current sum 758.

Figure 8:
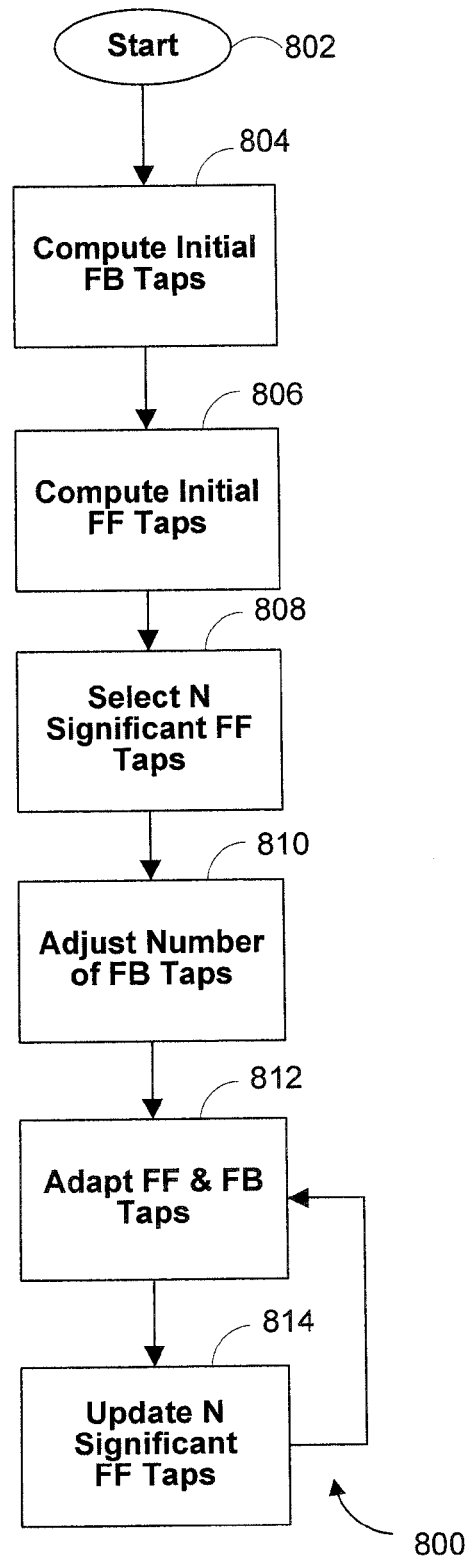
FIG. 8 is a flow diagram of an illustrative tapped delay line equalization according to an embodiment of the invention.

FIG. 8 is a flow diagram 800 of illustrative tapped delay line equalization according to an embodiment of the invention. Equalization can begin when an input signal is received at a step 802. For example, the input signal can be received from a communication channel. An initial set of feedback taps configured to equalize the channel can be computed at step 804. Step 804 can include any appropriate computations, such as a feedback Cholesky factorization. An initial set of feedforward taps configured to equalize the channel can be computed at step 806. Step 806 can be based on a result of step 804, and can include any appropriate computation, such as a feedforward back-substitution.

A set of significant taps can be selected from the initial set of feedforward taps at step 808. As discussed above, filtering with the set of significant taps instead of the initial set of feedforward taps can advantageously decrease the number of computations performed. The number of taps in the set of significant taps, N, can be adjustable, and can be determined by experimentation, heuristically, algorithmically, by any combination thereof, or by any other suitable method.

The number of taps in the set of feedback taps can be adjusted at step 810 from that of the initial set of feedback taps computed by step 806. The number of taps determined by step 810 can be adjustable, and can be determined by experimentation, heuristically, algorithmically, by any combination thereof, or by any other suitable method. Step 810 preferably adds at least one tap to the initial set of feedback taps. In one embodiment, step 810 can be based on a result of step 808. Increasing the number of taps in the set of feedback taps can advantageously improve the accuracy of the equalization, at least partially compensating for any loss of accuracy that may be incurred as a result of step 808. Advantageously, increasing the number of taps in the set of feedback taps often does not significantly increase the number of computations required to perform filtering with the set of feedback taps. Thus, steps 808 and 810, in combination, can advantageously decrease the total number of computations required for equalization while maintaining substantially the same level of accuracy.

Equalization can be maintained by adapting the set of feedforward taps and the set of feedback taps in response to changing channel characteristics at step 812. The adapting can include altering a value of a tap of the set of feedforward taps, altering a value of a tap of the set of feedback taps, or both. The sets of taps generated by step 812 can be based on results of steps 804 and 806 and can be configured to minimize a computed estimation error of the equalization. Adapting the set of feedforward taps preferably includes performing a LMS algorithm, which uses as input the set of feedforward taps computed by step 806. Similarly, adapting the set of feedback taps preferably includes performing a LMS algorithm, which uses as input the set of feedback taps computed by step 804.

The set of significant feedforward taps, the number of taps in the set of feedback taps, or both can be updated, if necessary, at step 814. Step 814 can be based on a result of step 812. In one embodiment, step 814 can find a lowest-magnitude tap, which has a lowest magnitude of any tap in the set of significant taps currently selected at the end of step 812. Step 814 can also find a highest-magnitude tap, which has a highest magnitude of any tap in the set of feedforward taps, but not in the set of significant taps currently selected, at the end of step 812. Finally, the lowest magnitude can be compared to the highest magnitude. If the lowest magnitude is less than the highest magnitude, then step 814 can modify the set of significant taps by removing the lowest-magnitude tap from the set of feedforward taps and adding the highest-magnitude tap to the set of feedforward taps. This process can be repeated until the lowest magnitude of any significant tap is greater than or equal to the highest magnitude of any insignificant tap. In another embodiment, step 814 can update the set of significant taps by sorting the set of feedforward taps in order of ascending or descending magnitude, and then selecting the highest-magnitude taps to form a set of significant taps.

As the channel characteristics may continue to change throughout equalization, flow diagram 800 can cycle back to step 812 from step 814. When step 812 is repeated, the sets of taps generated can be based on a result of a previous iteration of steps 812 and 814. Flow diagram 800 can then proceed to step 814, and cycle between steps 812 and 814 for as long as the equalization continues.

Referring now to FIGS. 9A-9E, various exemplary implementations of the present invention are shown.

Figure 9A:
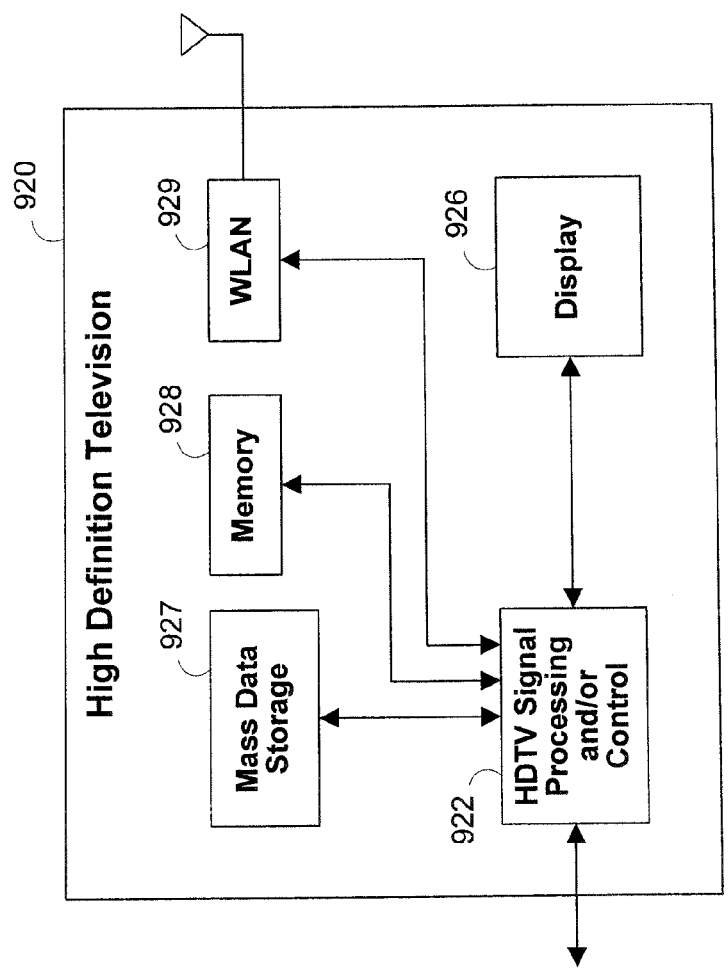
FIG. 9A is a block diagram of an exemplary high definition television that can employ the disclosed technology.

Referring now to FIG. 9A, the present invention can be implemented in a high definition television (HDTV) 920. The present invention may implement either or both signal processing and/or control circuits, which are generally identified in FIG. 9A at 922, a WLAN interface and/or mass data storage of the HDTV 920. The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, perform calculations, format data and/or perform any other type of HDTV processing that may be required.

The HDTV 920 may communicate with mass data storage 927 that stores data in a nonvolatile manner, such as optical and/or magnetic storage devices, for example hard disk drives HDD and/or DVDs. The HDD may be a mini HDD that includes one or more platters having a diameter that is smaller than approximately 1.8". The HDTV 920 may be connected to memory 928 such as RAM, ROM, low latency nonvolatile memory such as flash memory and/or other suitable electronic data storage. The HDTV 920 also may support connections with a WLAN via a WLAN network interface 929.

Figure 9B:
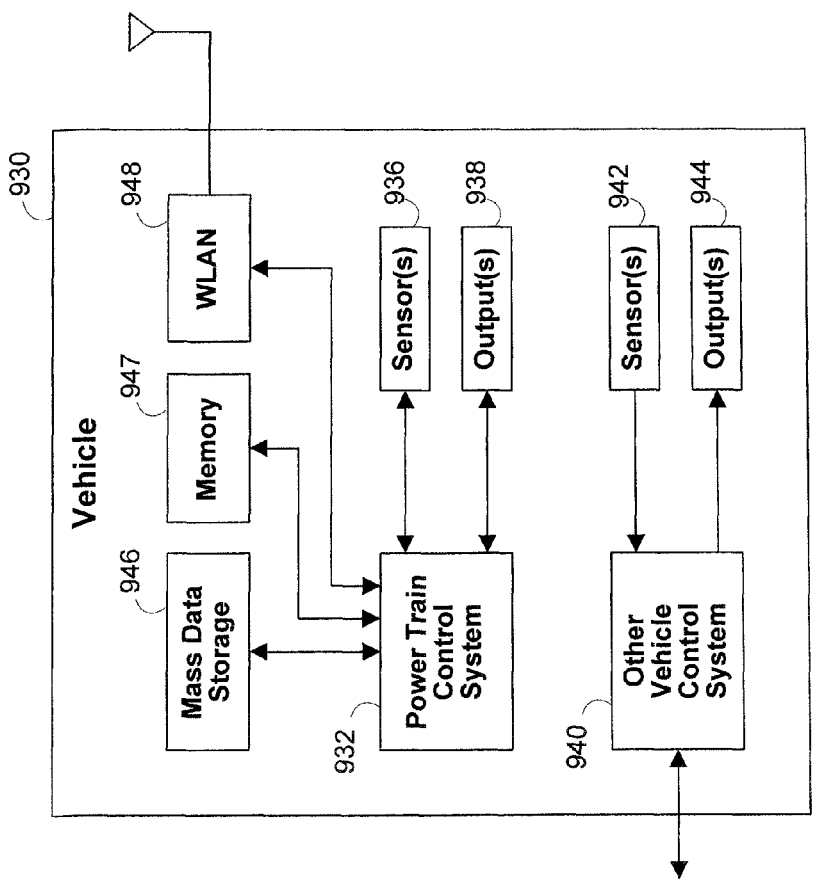
FIG. 9B is a block diagram of an exemplary vehicle that can employ the disclosed technology.

Referring now to FIG. 9B, the present invention implements a control system of a vehicle 930, a WLAN interface and/or mass data storage of the vehicle control system. In some implementations, the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 940 of the vehicle 930. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. The HDD may be a mini HDD that includes one or more platters having a diameter that is smaller than approximately 1.8". The powertrain control system 932 may be connected to memory 947 such as RAM, ROM, low latency nonvolatile memory such as flash memory and/or other suitable electronic data storage. The powertrain control system 932 also may support connections with a WLAN via a WLAN network interface 948. The control system 940 may also include mass data storage, memory and/or a WLAN interface (all not shown).

Figure 9C:
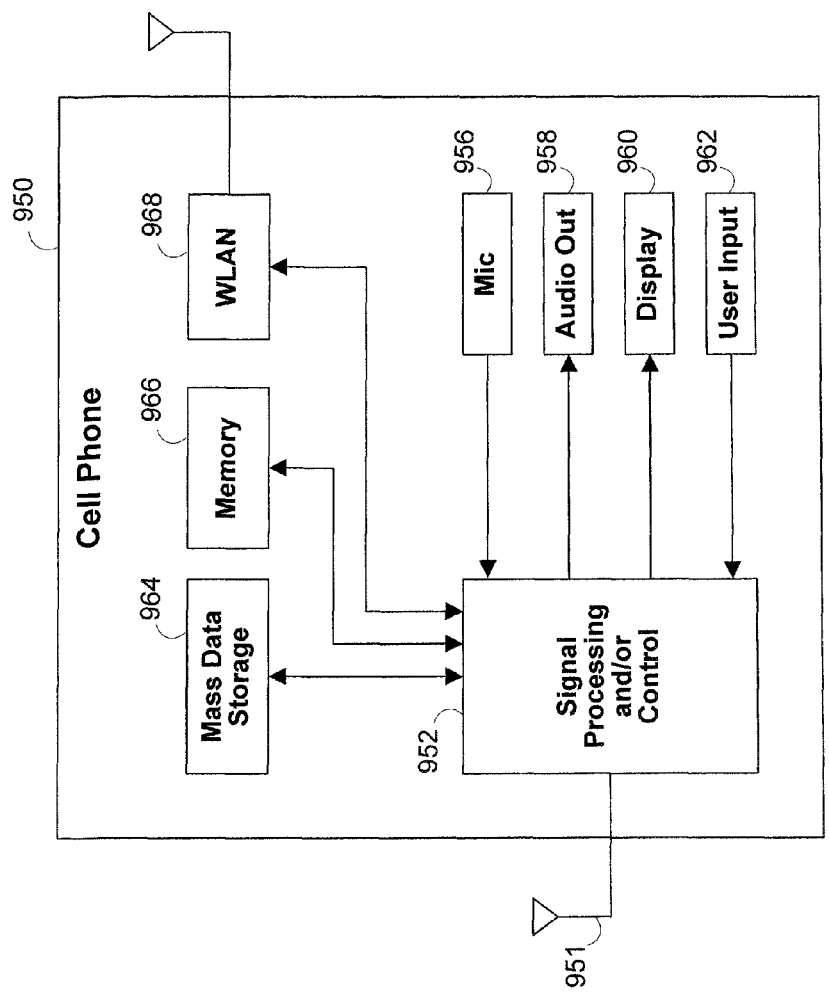
FIG. 9C is a block diagram of an exemplary cellular phone that can employ the disclosed technology.

Referring now to FIG. 9C, the present invention can be implemented in a cellular phone 950 that may include a cellular antenna 951. The present invention may implement either or both signal processing and/or control circuits, which are generally identified in FIG. 9C at 952, a WLAN interface and/or mass data storage of the cellular phone 950. In some implementations, the cellular phone 950 includes a microphone 956, an audio output 958 such as a speaker and/or audio output jack, a display 960 and/or an input device 962 such as a keypad, pointing device, voice actuation and/or other input device. The signal processing and/or control circuits 952 and/or other circuits (not shown) in the cellular phone 950 may process data, perform coding and/or encryption, perform calculations, format data and/or perform other cellular phone functions.

The cellular phone 950 may communicate with mass data storage 964 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 950 may be connected to memory 966 such as RAM, ROM, low latency nonvolatile memory such as flash memory and/or other suitable electronic data storage. The cellular phone 950 also may support connections with a WLAN via a WLAN network interface 968.

Figure 9D:
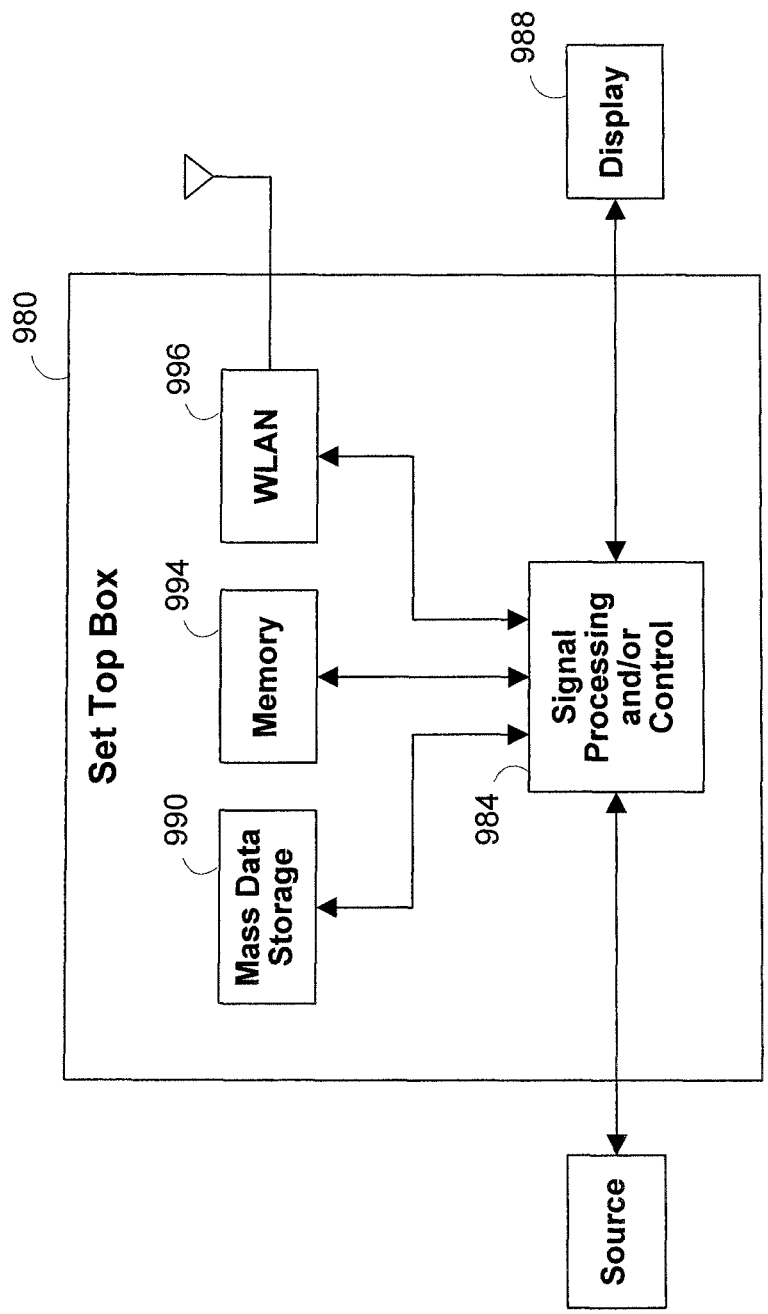
FIG. 9D is a block diagram of an exemplary set top box that can employ the disclosed technology.

Referring now to FIG. 9D, the present invention can be implemented in a set top box 980. The present invention may implement either or both signal processing and/or control circuits, which are generally identified in FIG. 9D at 984, a WLAN interface and/or mass data storage of the set top box 980. The set top box 980 receives signals from a source such as a broadband source and outputs standard and/or high definition audio/video signals suitable for a display 988 such as a television and/or monitor and/or other video and/or audio output devices. The signal processing and/or control circuits 984 and/or other circuits (not shown) of the set top box 980 may process data, perform coding and/or encryption, perform calculations, format data and/or perform any other set top box function.

The set top box 980 may communicate with mass data storage 990 that stores data in a nonvolatile manner. The mass data storage 990 may include optical and/or magnetic storage devices for example hard disk drives HDD and/or DVDs. The HDD may be a mini HDD that includes one or more platters having a diameter that is smaller than approximately 1.8". The set top box 980 may be connected to memory 994 such as RAM, ROM, low latency nonvolatile memory such as flash memory and/or other suitable electronic data storage. The set top box 980 also may support connections with a WLAN via a WLAN network interface 996.

Figure 9E:
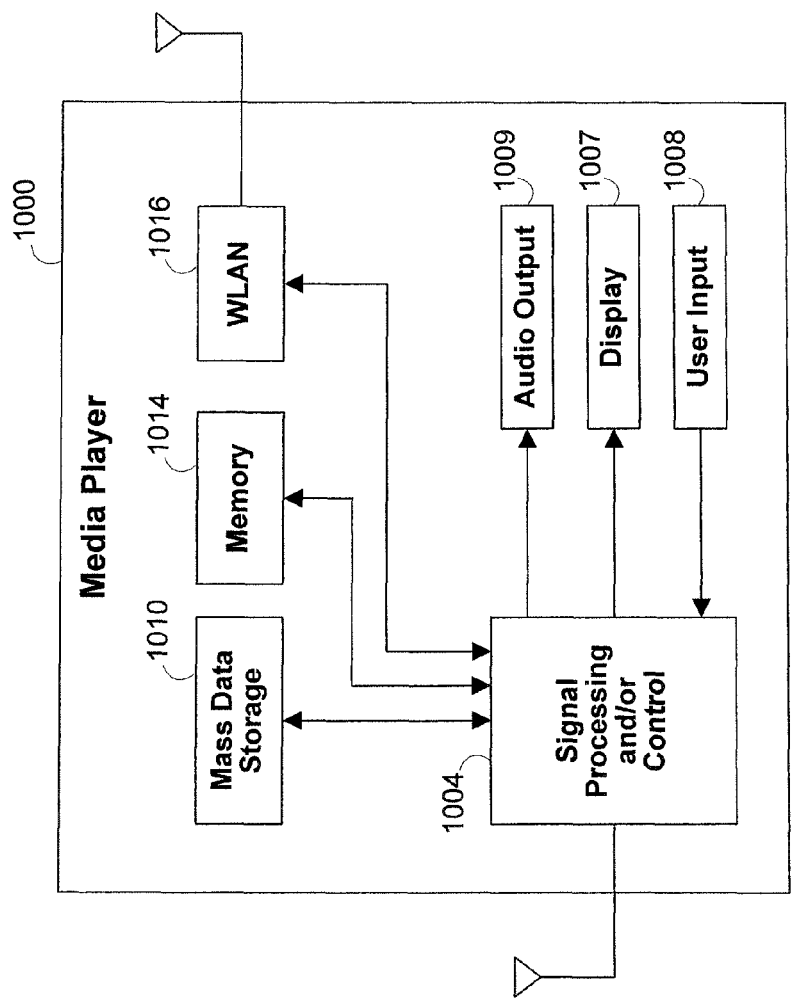
FIG. 9E is a block diagram of an exemplary media player that can employ the disclosed technology.

Referring now to FIG. 9E, the present invention can be implemented in a media player 1000. The present invention may implement either or both signal processing and/or control circuits, which are generally identified in FIG. 9E at 1004, a WLAN interface and/or mass data storage of the media player 1000. In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack. The signal processing and/or control circuits 1004 and/or other circuits (not shown) of the media player 1000 may process data, perform coding and/or encryption, perform calculations, format data and/or perform any other media player function.

The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1000 may be connected to memory 1014 such as RAM, ROM, low latency nonvolatile memory such as flash memory and/or other suitable electronic data storage. The media player 1000 also may support connections with a WLAN via a WLAN network interface 1016. Still other implementations in addition to those described above are contemplated.

Thus it is seen that methods and apparatus are provided for achieving efficient and reliable equalization of channels. One skilled in the art will appreciate that the invention can be practiced by embodiments other than those described, which are presented for the purposes of illustration and not of limitation, and the present invention is limited only by the claims which follow.

What is claimed is:

1. A method of configuring equalization circuitry, the method comprising:
   receiving a first set of feedforward taps with a plurality of data inputs of a multiplexer;
   coupling one of the plurality of data inputs of the multiplexer to feedforward filter circuitry to filter an input signal, wherein the coupling generates a second set of feedforward taps;
   adding, in response to the coupling, a compensating set of feedback taps to a first set of feedback taps to generate a second set of feedback taps in communication with the feedforward filter circuitry to filter the input signal;
   determining changing channel characteristics; and
   adapting the second set of feedforward taps and the second set of feedback taps in response to the determined channel characteristics.

2. The method of claim 1, wherein:
   respective ones of feedforward taps are coupled to respective ones of the plurality of data inputs;
   an output of the multiplexer is coupled to feedforward filter circuitry; and
   the coupling further comprises coupling one of the plurality of data inputs of the multiplexer to the output of the multiplexer, and wherein the coupling is based on a control signal received at a control input of the multiplexer.

3. The method of claim 1 further comprising:
   computing the first set of feedback taps; and
   computing the first set of feedforward taps based on a result of the computing the set of feedback taps.

4. The method of claim 3 wherein:
   computing the first set of feedback taps comprises performing a feedback Cholesky factorization; and
   computing the first set of feedforward taps comprises performing a feedforward back-substitution.

5. The method of claim 1 further comprising:
   generating a feedforward output signal from the feedforward filter circuitry;
   generating a feedback output signal from the feedback filter circuitry;
   computing an error signal based at least in part on the feedforward output signal and the feedback output signal; and
   adapting the second set of feedforward taps and the second set of feedback taps based on the computed error signal.

6. The method of claim 5 wherein the adapting comprises:
   performing a least-mean-square algorithm;
   altering a value of a tap of the second set of feedforward taps based on a result of the performing the least-mean-square algorithm; and
   altering a value of a tap of the second set of feedback taps based on a result of the performing the least-mean-square algorithm.

7. The method of claim 6 wherein performing the least-mean-square algorithm comprises computing a sign of the computed error signal.

8. The method of claim 5 further comprising:
   comparing a magnitude of a lowest-magnitude tap of the second set of feedforward taps to a magnitude of a highest-magnitude tap in the first set of feedforward taps that is not in the second set of feedforward taps wherein:
      the magnitude of the lowest-magnitude tap is less than or substantially equal to a magnitude of any other tap of the second set of feedforward taps;
      the magnitude of the highest-magnitude tap is greater than or substantially equal to a magnitude of any other tap of the first set of feedforward taps that is not in the second set of feedforward taps;
   removing the lowest-magnitude tap from the second set of feedforward taps if the magnitude of the lowest-magnitude tap is less than the magnitude of the highest-magnitude tap; and
   adding the highest-magnitude tap to the second set of feedforward taps if the magnitude of the lowest-magnitude tap is less than the magnitude of the highest-magnitude tap.

9. The method of claim 5 further comprising:
   sorting the second set of feedforward taps by magnitude to form an ordered set of feedforward taps; and
   selecting at least one consecutive tap from the ordered set of feedforward taps, wherein each tap of the selected at least one consecutive tap has a magnitude that is greater than or substantially equal to a magnitude of any tap of the ordered set of feedforward taps that is not in the selected at least one consecutive tap.

10. A system for equalizing an input signal, the system comprising:
   a multiplexer operable to receive a first set of feedforward taps with a plurality of data inputs;
   feedforward filter circuitry operable to receive the input signal;
   feedback filter circuitry in communication with the feedforward filter circuitry;

circuitry operable to couple one of the plurality of data inputs of the multiplexer to the feedforward filter circuitry to filter the input signal, wherein the coupling generates a second set of feedforward taps;

feedback tap addition circuitry in communication with the feedback filter circuitry, wherein the feedback tap addition circuitry is configured to generate a second set of feedback taps by adding, in response to the coupling, a compensating set of feedback taps to a first set of feedback taps to filter the input signal; and circuitry operable to:
  determine changing channel characteristics; and
  adapt the second set of feedforward taps and the second set of feedback taps in response to the determined channel characteristics.

11. The system of claim 10, wherein:
respective ones of feedforward taps are coupled to respective ones of the plurality of data inputs;
the feedforward filter circuitry is coupled to an output of the multiplexer;
the feedback filter circuitry is configured to select the first set of feedback taps; and
the system further comprises control circuitry in communication with the feedforward filter circuitry and the feedback filter circuitry, wherein the control circuitry comprises:
  the feedback tap addition circuitry; and
  selector circuitry configured to generate a control signal received at a control input of the multiplexer, based on which one of the plurality of data inputs of the multiplexer is coupled to the output of the multiplexer to filter the input signal.

12. The system of claim 11 wherein:
the control circuitry further comprises tap computation circuitry in communication with the feedforward filter circuitry and the feedback filter circuitry; and
the tap computation circuitry comprises:
  circuitry configured to compute the first set of feedback taps; and
  circuitry configured to compute the first set of feedforward taps based on a result of the computing the first set of feedback taps.

13. The system of claim 12 wherein the tap computation circuitry further comprises:
circuitry configured to compute the first set of feedback taps in accordance with a feedback Cholesky factorization; and
circuitry configured to compute the first set of feedforward taps in accordance with a feedforward back-substitution.

14. The system of claim 11 further comprising:
first adaptation circuitry in communication with the feedforward filter circuitry, wherein the first adaptation circuitry is configured to adapt the second set of feedforward taps based on a computed error signal; and
second adaptation circuitry in communication with the feedback filter circuitry, wherein the second adaptation circuitry is configured to adapt the second set of feedback taps based on the computed error signal.

15. The system of claim 14 wherein:
the first adaptation circuitry is further configured to perform a first least-mean-square algorithm and alter a value of a tap of the second set of feedforward taps based on a result of the performing the first least-mean-square algorithm; and
the second adaptation circuitry is further configured to perform a second least-mean-square algorithm and alter a value of a tap of the second set of feedback taps based on a result of the performing the second least-mean-square algorithm.

16. The system of claim 15 further comprising:
decision device circuitry in communication with the feedforward filter circuitry and the feedback filter circuitry;
addition circuitry in communication with the decision device circuitry, wherein the addition circuitry is configured to compute the error signal based on an input signal of the decision device circuitry and an output signal of the decision device circuitry; and
sign circuitry in communication with the addition circuitry and the first and second adaptation circuitries, wherein the sign circuitry is configured to compute a sign of the computed error signal and to transmit the computed sign to the first and second adaptation circuitries.

17. The system of claim 14 wherein the selector circuitry comprises:
comparison circuitry in communication with the feedforward filter circuitry, wherein the comparison circuitry is configured to compare a magnitude of a lowest-magnitude tap of the second set of feedforward taps to a magnitude of a highest-magnitude tap in the first set of feedforward taps, wherein:
  the magnitude of the lowest-magnitude tap is less than or substantially equal to a magnitude of any other tap of the second set of feedforward taps; and
  the magnitude of the highest-magnitude tap is greater than or substantially equal to a magnitude of any other tap of the first set of feedforward taps;
feedforward tap removal circuitry in communication with the comparison circuitry, wherein the feedforward tap removal circuitry is configured to remove the lowest-magnitude tap from the second set of feedforward taps if the magnitude of the lowest-magnitude tap is less than the magnitude of the highest-magnitude tap; and
feedforward tap addition circuitry in communication with the comparison circuitry, wherein the feedforward tap addition circuitry is configured to add the highest-magnitude tap to the second set of feedforward taps if the magnitude of the lowest-magnitude tap is less than the magnitude of the highest-magnitude tap.

18. The system of claim 14 wherein the selector circuitry comprises:
tap sorter circuitry in communication with the feedforward filter circuitry, wherein the tap sorter circuitry is configured to sort the second set of feedforward taps by magnitude to form an ordered set of feedforward taps; and
tap selection circuitry in communication with the tap sorter circuitry, wherein the tap selection circuitry is configured to select at least one consecutive tap from the ordered set of feedforward taps, wherein each tap of the selected at least one consecutive tap has a magnitude that is greater than or substantially equal to a magnitude of any tap of the ordered set of feedforward taps that is not in the selected at least one consecutive tap.

19. A method of configuring equalization circuitry, the method comprising:
receiving a first set of feedforward taps with a plurality of data inputs of a multiplexer;
coupling one of the plurality of data inputs of the multiplexer to feedforward filter circuitry to filter an input signal, wherein the coupling generates a second set of feedforward taps; and
adding, in response to the coupling, a compensating set of feedback taps to a first set of feedback taps to generate a second set of feedback taps in communication with the feedforward filter circuitry to filter the input signal.

20. The method of claim 19, further comprising:
determining changing channel characteristics; and
adapting the second set of feedforward taps and the second set of feedback taps in response to the determined channel characteristics.

* * * * *